(12) United States Patent
Hockemeyer et al.

(10) Patent No.: US 6,246,147 B1
(45) Date of Patent: Jun. 12, 2001

(54) DEVICE FOR FORMING A LENO SELVEDGE WITH AN ELECTRIC MOTOR COMPRISING A ROTOR AND A STATOR ACCOMODATING THE ROTOR

(75) Inventors: Kurt Hockemeyer; Christoph Schwemmlein, both of Borken-Weseke (DE)

(73) Assignee: Klocker-Entwicklungs-BmbH, Borken-Weseke (DE)

( * ) Notice: Subject to any disclaimer, the term of this patent is extended or adjusted under 35 U.S.C. 154(b) by 0 days.

(21) Appl. No.: 09/663,241

(22) Filed: Sep. 15, 2000

Related U.S. Application Data

(63) Continuation of application No. PCT/DE99/00823, filed on Mar. 20, 1999.

(30) Foreign Application Priority Data

Mar. 25, 1998 (DE) .............................................. 198 13 082

(51) Int. Cl.⁷ ...................................................... H02K 1/22
(52) U.S. Cl. ........................... 310/268; 310/267; 310/156
(58) Field of Search .................................. 310/268, 261, 310/267, 156; 139/54

(56) References Cited

U.S. PATENT DOCUMENTS

| | | |
|---|---|---|
| 3,700,942 | 10/1972 | Alth . |
| 3,869,627 | 3/1975 | Corser et al. . |
| 4,330,727 | 5/1982 | Oudet . |
| 6,006,792 | * 12/1999 | Krumm et at. .................. 139/54 |

FOREIGN PATENT DOCUMENTS

| | | |
|---|---|---|
| 297 13 723 U | 11/1997 | (DE) . |
| 0 674 031 | 8/1998 | (EP) . |
| WO 94/19859 | 9/1994 | (WO) . |

* cited by examiner

*Primary Examiner*—Nestor Ramirez
*Assistant Examiner*—Thanh Lam
(74) *Attorney, Agent, or Firm*—Thomas R. Vigil

(57) ABSTRACT

Device for forming a leno selvedge with an electric motor comprising a rotor (1; 200) and a stator casing (10) accommodating the rotor, whereas the rotor is provided with at least two guiding apertures (3; 216, 216b) for the doup ends and whereas the rotor (1, 200) is provided with several magnetic poles oriented in axial direction, the rotor (1; 200) being provided with two spaced magnetic rings (210, 220) arranged in radial direction, the magnetic rings (210, 220) being provided with several magnet segments (2; 211, 212; 221, 222) each, the magnet segments (2; 211, 212) of the one magnetic ring (2; 210) being locally offset relative to those of the other magnetic ring (2; 210, 220), whereas the rotor (1; 100) is received on both sides in axial direction by the stator casing (10; 225), whereas the stator casing (10; 225) is provided with iron cores (11; 230, 240) with appropriate windings (12; 250), the ends of which being oriented toward the magnetic poles of the rotor.

17 Claims, 4 Drawing Sheets

DEVICE FOR FORMING A LENO SELVEDGE WITH AN ELECTRIC MOTOR COMPRISING A ROTOR AND A STATOR ACCOMODATING THE ROTOR

This application is a continuation of international application No. PCT/DE99/00823, filed Mar. 20, 1999, (status, abandoned, pending, etc).

BACKGROUND OF THE INVENTION

1. Field of the Invention

The invention relates to a device for forming a leno selvedge with an electric motor comprising a rotor and a stator accommodating the rotor, whereas the rotor is provided with at least two guiding apertures for the doup ends and whereas the rotor is provided with several magnetic poles oriented in axial direction.

2. Description of the Prior Art

The document EP 674 031 discloses a so-called rotary selvedge twisting apparatus for power-operated looms provided with a ring serving as a rotor and lodged in a casing designed as a stator. This ring, which may also be called a disc, has two guiding apertures for threading the doup ends. According to the state of the art, the ring is additionally provided radially, i.e. on its outer periphery, with magnets arranged thereon and cooperating with the corresponding laminations arranged in the stator casing. As the rotor revolves in the casing, the doup ends guided by the rotor in the two thread guiding apertures are twisted, whereas at each twist one weft thread is firmly locked in place by this twisting. The principle of operation of such a device for forming a leno selvedge is sufficiently well known.

This well-known device for forming a leno selvedge, which, as already described above, is designed as an electric motor, the magnets for the electric motor being tangentially arranged on the periphery of the rotor and the stator being accordingly provided with corresponding laminations, is characterized by a reduced speed and a high moment of inertia. This is a disadvantage since, when using this contrivance as a device for forming a full leno selvedge, the direction of rotation of the rotor must be reversed after a determined number of revolutions in order to undo a twisting of the doup ends on the feeding side of the doup ends. Since the time available for such an inversion of the direction of rotation is very short due to the high number of weft on modern power-operated looms, the motor must have an extremely high velocity while having a small moment of inertia.

A rotary selvedge twisting apparatus of the type mentioned above is described in DE 297 13723.9, said twisting apparatus being provided with a stator and a doup disc, the doup disc having on its one side magnets oriented toward the stator. These magnets are arranged on the actual disc body. The short circuit obviously occurs on one side of the disc, namely on the side facing the stator.

The disadvantage thereof is that the power density that may be achieved with this well-known structural shape of a rotary selvedge twisting apparatus is small.

U.S. Pat. No. 4,330,737 describes the rotor as being accommodated by the stator casing in axial direction on both sides, the stator casing being provided with iron cores with appropriate windings. The ends of the windings are pointing toward each other, though. As a result, the motor cannot have the required dynamics and power that would be necessary to utilize it in a device for forming a leno selvedge since the magnetic flux is not optimal.

U.S. Pat. No. 3,700,942 discloses a motor in which the rotor is locked on both sides by the stator casing. The rotor is also provided with magnetic poles but it has to be noted that the coil of the stator casing is arranged on the front relative to the rotor in the stator casing. This signifies that, in principle just as in the embodiment according to DE 297 13 723, the magnetic field lines form a leakage flux on account of the air gap to be overcome, which brings about a considerable decrease of performance.

SUMMARY OF THE INVENTION

The object of the present invention is therefor to provide a rotary selvedge twisting apparatus of the type mentioned above that has a high power density and that allows a fast inversion of the direction of rotation.

The solution of this object is to have the rotor provided with two spaced magnetic rings arranged in radial direction, the magnetic rings being provided with several magnet segments each, the magnet segments of the one magnetic ring being locally offset relative to those of the other magnetic ring, whereas the rotor is received on both sides in axial direction by the stator casing, whereas the stator casing is provided with iron cores with appropriate windings, the ends of which being oriented toward the magnetic poles of the rotor. The magnetic poles are thus oriented in the direction of the rotational axis of the rotor and the stator accordingly locks with its laminations the rotor on both sides in axial direction as well. This clearly shows that the flow of force runs axially; the entire surface on both sides of the rotor, which may be designed as a through disc or as an annular disc for example, is thus available as a magnetic surface. A large magnetic surface or a large number of magnetic poles occasions a high torque and hence a high acceleration of the rotor. The low moment of inertia is achieved by the fact that the disc accommodating the magnetic poles may be extremely thin, particularly if the disc itself is magnetized in segments, no additional weight being added by magnets arranged on the disc, as this is the case with prior art.

The following should furthermore be noted: The rotor has apertures for receiving doup ends. Due to this way of having the doup ends guided in the stator casing by the rotor, the magnetic short circuit is undone. The stator casing is thus composed of two parts or halves. This means that the magnetic reluctance of the short circuit is increased, the performance of the motor naturally decreasing as a result thereof. Particularly due to the fact that the rotor is provided with two radially spaced magnetic poles, each having several magnetic segments offset relative to each other, the radial arrangement of two magnetic rings causes this decrease of performance to be more than compensated by undoing the magnetic short circuit.

According to a particular characteristic of the invention, the stator is designed as a casing surrounding the rotor at least partially on the periphery, the rotor being rotatably carried in bearings in tangential arrangement, i.e. on its periphery in the casing. This may for example be achieved by providing the stator casing with ball or needle bearings which rotatably lock the rotor on its periphery. The rotor may however also be carried in a contactless manner by way of air or magnetic bearings. This clearly shows that the rotor and hence the motor may be mounted on the power-operated loom so as to be substantially perpendicular to said loom, the advantage thereof being that said rotor, thanks to its compact design, may also be arranged in axial direction between the heald frames of the power-operated loom.

More specifically, the stator casing has at least two preferably C-shaped iron cores which positively lock the rotor on both sides, i.e. on both sides in axial direction of the rotor. It is well known that there is an air gap between the rotor and the stator; this air gap is present in each electric motor and is due to construction; in the present case, it however also serves to guide the doup ends past the rotor during rotation of the same. As a result, the construction of an electric motor according to the teaching of the present invention makes it possible to have the rotor carried in bearings without a central axis being carried in the casing. The rotatable arrangement of the rotor by such a central axis is not conceivable since the doup ends would snarl around this central axis while the rotor were rotating. This means that the construction according to the invention realizes two advantages:

1. it allows to carry the rotor in the stator without hindering the path of the doup ends from one side of the rotor to the other side of the rotor;
2. thanks to its design, such a motor has a small moment of inertia while having a high torque, which allows a high acceleration rate with regard to an inversion of the direction of rotation.

Since the rotor is provided on its surface with a plurality of magnetic poles, extremely precise positioning is possible even in microstep operation, the advantage thereof being that it makes it overall easier to mount the device onto the power-operated loom with regard to the adjustment of the aperture angle of the shaft.

A particular embodiment is characterized by two rotors for the production in parallel of two selvedges, for example of a cut-off selvedge and a leno selvedge. To this end, a disc-shaped ferric short circuit is arranged between the two stator halves of the stator, a rotor being provided on either side of the ferric short circuit. The rotors may be activated in different ways on account of the separate magnetic circuits.

The motors consisting of a rotor and a stator are advantageously designed as stepping motors. As opposed to servomotors, the automatic control technique is considerably smaller on stepping motors because the permanent monitoring of the rotor's position and the appropriate correction of the rotor's position with regard to automatic control technique are no longer necessary. Accordingly, a stepping motor needs no automatic control, but merely a control. Should nonsynchronized operating states occur on the stepping motor, they may be corrected by one single pulse that is triggered once per revolution and that is checked to occur at the right time.

Further advantageous embodiments of the invention will become apparent from the subclaims.

The invention is explained more explicitly in the following with the help of the drawings.

BRIEF DESCRIPTION OF THE PREFERRED EMBODIMENT(S)

Figure 1:
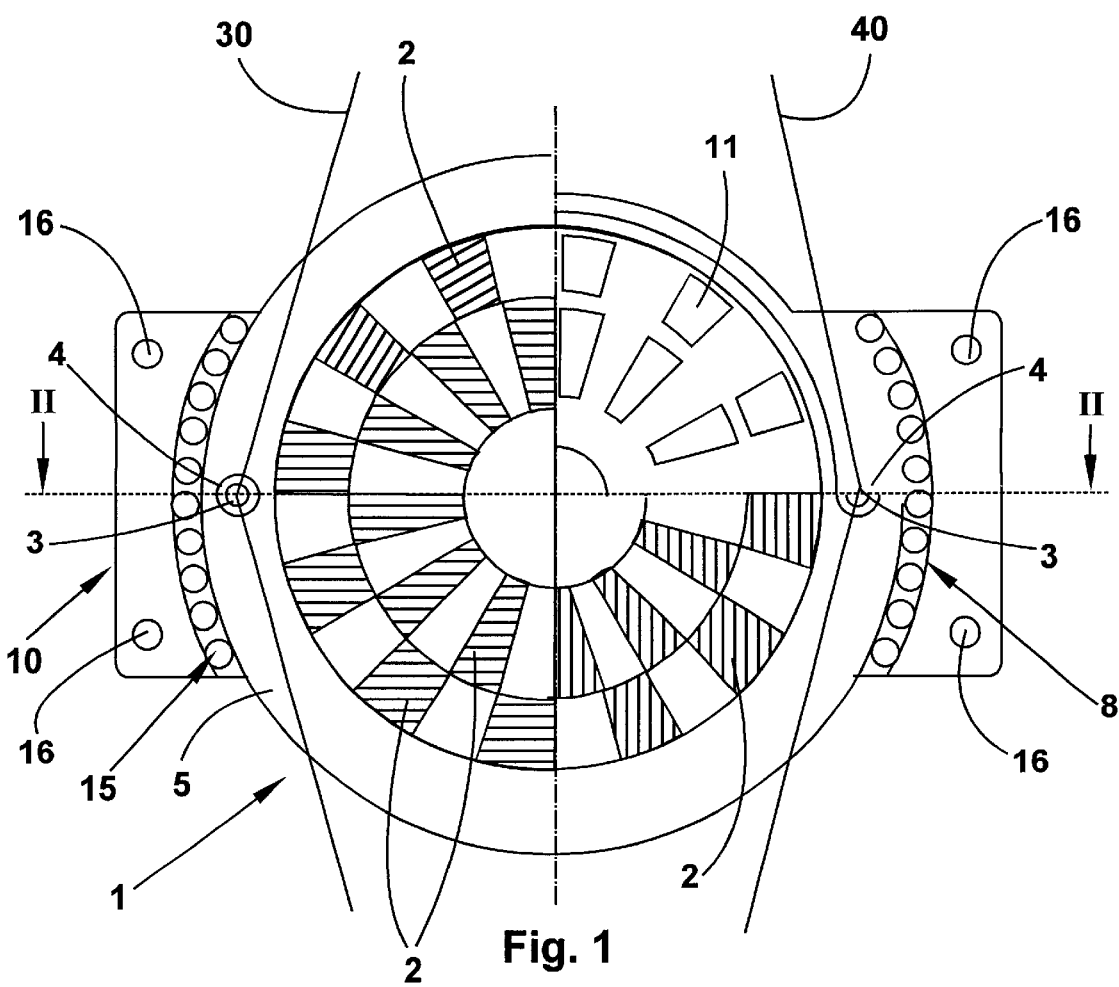
FIG. 1 is a side view of the device, the front part of the casing having been omitted.
Figure 2:
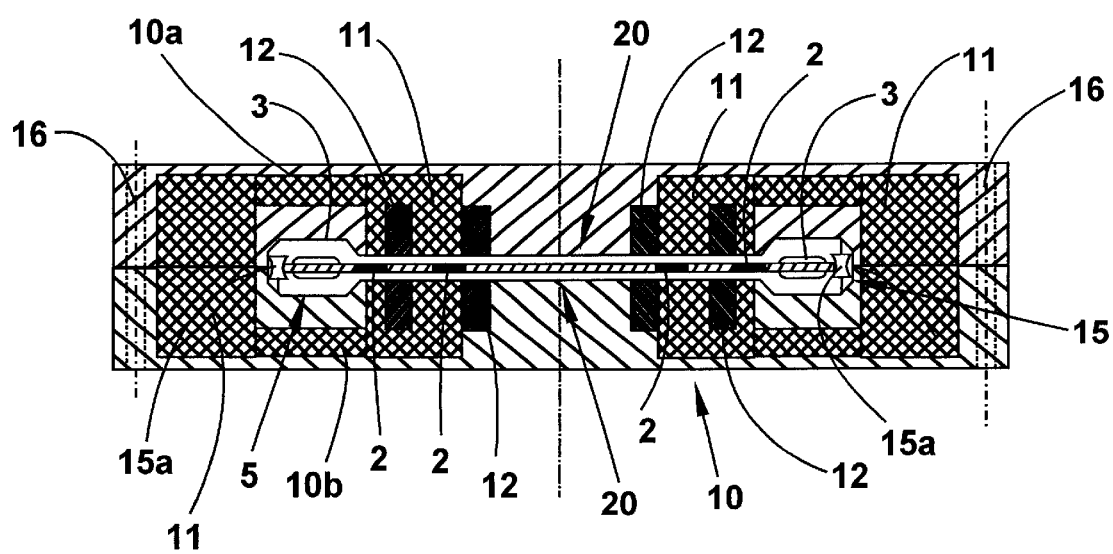
FIG. 2 is a section along the line II—II of FIG. 1.

According to the FIGS. 1 and 2, the rotor is referred to with numeral 1 and the stator casing receiving the rotor with numeral 10. The rotor 1 is provided on its surface, on both sides of the rotor, with magnets 2, the magnets 2 on the two sides of the rotor being oppositely poled. This means that the magnet designed as magnetic north on one side of the surface is designed as magnetic south on the other, opposite side of the rotor. The arrangement of the magnets 2 on the rotor is such that two circular arrangements of magnets are created. The rotor itself is additionally provided radially with a ring area 5 that is not equipped with magnets and that is provided with the two apertures 3 through which the doup ends are threaded. To reduce wear, these apertures 3 may be provided with ceramic inserts 4.

The rotor 1 is accommodated in the stator casing 10. The overall stator casing referred to as 10 has C-shaped iron cores 11 with corresponding windings 12, the ends of which being oriented toward the magnets of the rotor. There is an air gap 20 between the rotor and the casing or between the rotor and the iron core respectively, the doup ends 30, 40 being guided in said air gap. The casing 10, which shows the two stator halves 10a, 10b, is furthermore provided with a rolling bearing 15 which points toward the periphery of the rotor 1 and carries the rotor in the stator casing or in the stator. This clearly shows that the rotor is carried in the casing on its tangential periphery by the rolling bearing. The mounting on bearings of the rotor in axial direction may be performed by dividing the rolling bodies 15a and by giving the rotor 1 a corresponding shape with an outward bending. Screws 16 hold the two parts 10a, 10b of the stator 10 together; the width 18 of the stator casing is chosen in such a way that the rotor may be positively locked by the stator or by the stator casing respectively.

Figure 3:
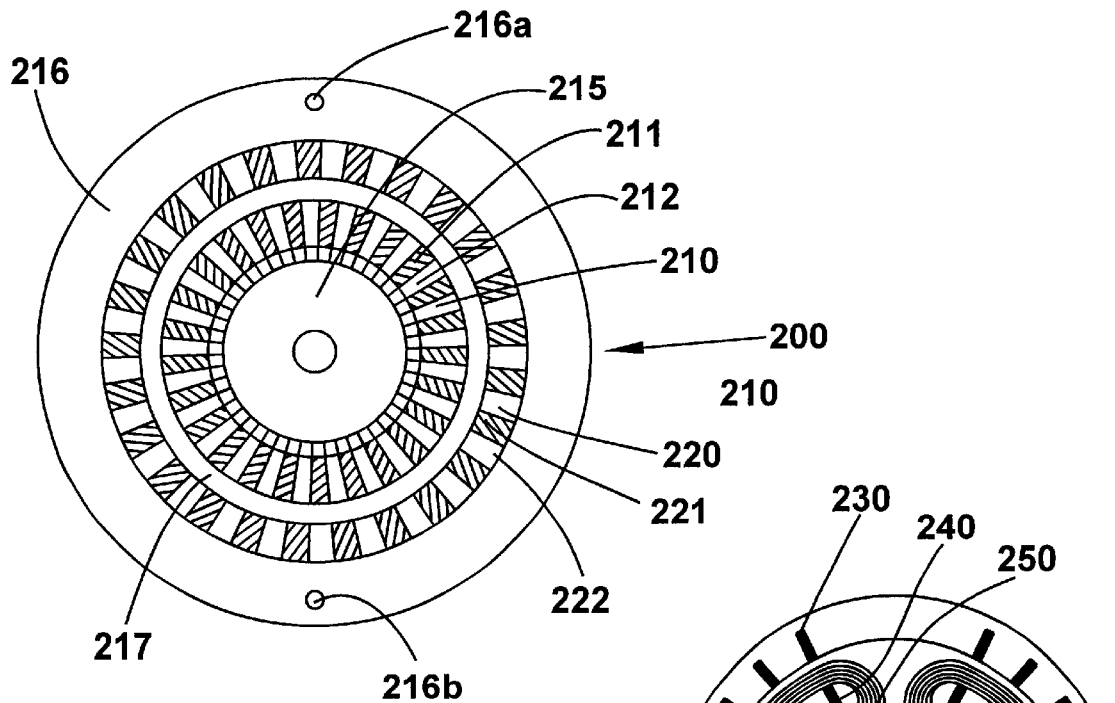
FIG. 3 is a schematic illustration of another embodiment of a doup disc with two magnetic rings.
Figure 4:
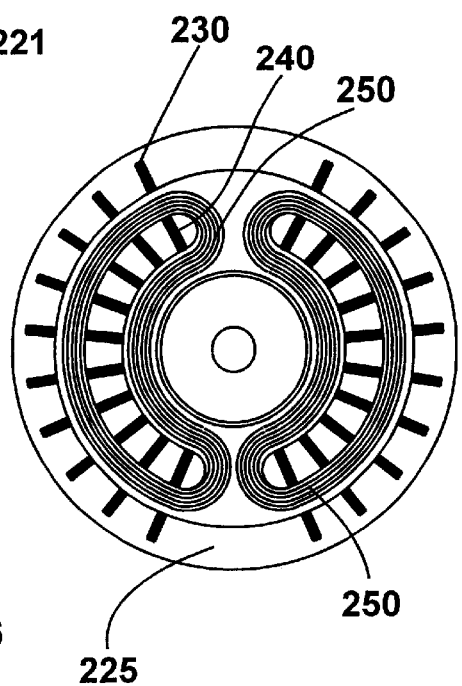
FIG. 4 is a schematic illustration of one stator half for a doup disc according to FIG. 3.
Figure 5:
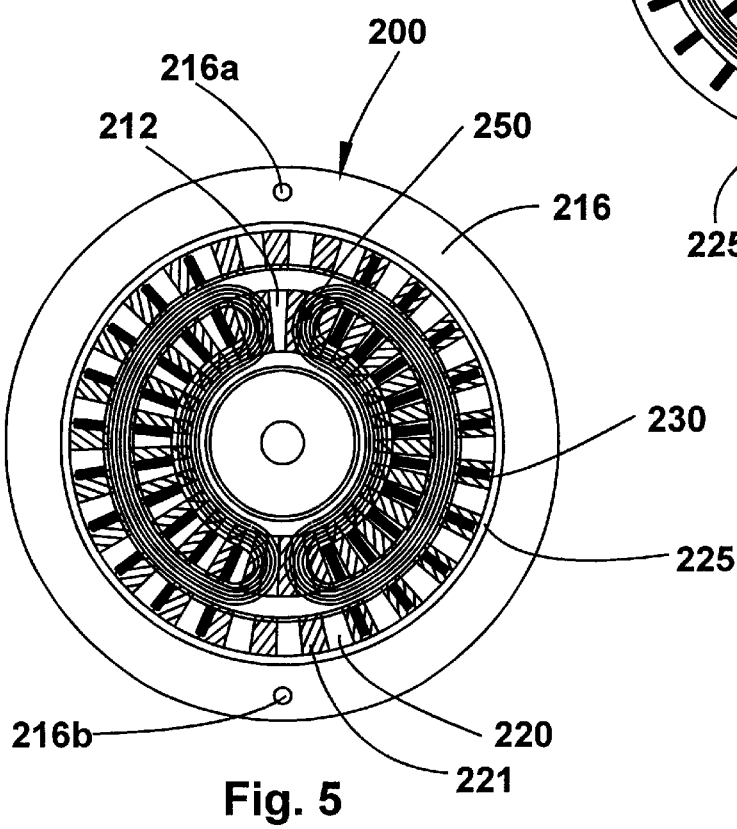
FIG. 5 is a schematic illustration of the arrangement of the stator and the doup disc according to FIG. 3 and to FIG. 4.

The embodiment according to the FIGS. 3 to 5 is only illustrated schematically. In these two schematic illustrations, the mounting on bearings of the doup disc has been omitted. It is done however in a way similar to the configuration according to the FIGS. 1 and 2, that is tangentially on the periphery of the disc, by means of rolling or ball bearings. The stator casing is hereby referred to with numeral 225.

In the embodiment according to the FIGS. 3 to 5, a doup disc or a rotor 200 is provided that is equipped with two disc-like magnetic rings 210 and 220 spaced relative to each other in radial direction, the magnetic rings having each several magnet segments 211, 212, and 221, 222 respectively. The magnet segments 211, 212 and 221, 222 respectively are offset relative to each other. I.e., the magnet segments in the different rings each have a different polarization than the neighbouring segment and are also offset relative to those of the neighbouring ring. This doup disc 200 too is provided with a supporting disc 215 and with a guiding ring 216, the two disc-shaped magnetic rings 210, 220 being arranged between the two of them. The two magnet rings 210, 220 are hereby kept apart by means of a spacer ring 217. The supporting disc 215, the guiding ring 216 with the two guiding apertures 216a and 216b for the doup ends as well as the spacer ring 217 are made of a nonconducting material.

The embodiment of the stator consisting of two casing halves 225 is shown in FIG. 4; the iron cores 230, 240 are aligned behind each other, which offers some advantages regarding manufacturing. The winding in FIG. 4 is referred to as 250.

For manufacturing a doup disc as it is illustrated in the embodiment according to the FIGS. 3 to 5, the doup disc may be provided with magnetically, and advantageously electrically as well, nonconducting foils for the purpose of connecting the different elements, namely the supporting disc, the magnetic rings and the guiding ring and possibly the spacer ring 217 as illustrated in FIG. 3. These elements, which constitute the proper doup disc, have such foils glued on both sides in order to thus confer on such a disc the stability and rigidity it needs to carry out its function.

Figure 6:
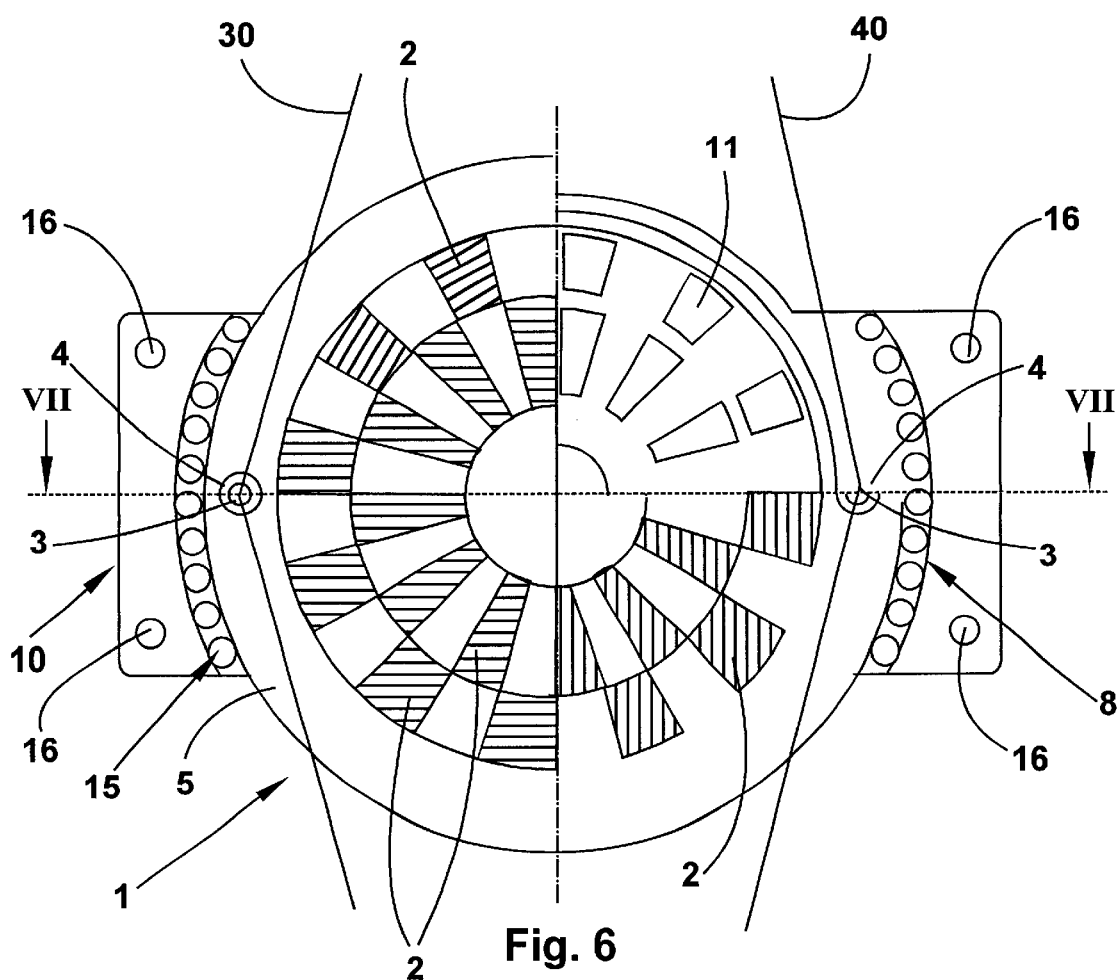
FIGS. 6 and 7 show an embodiment with a stator divided into two parts, the one half of the stator being merely provided with a ferric short circuit, as may be seen on the sectional view according to FIG. 7.
Figure 7:
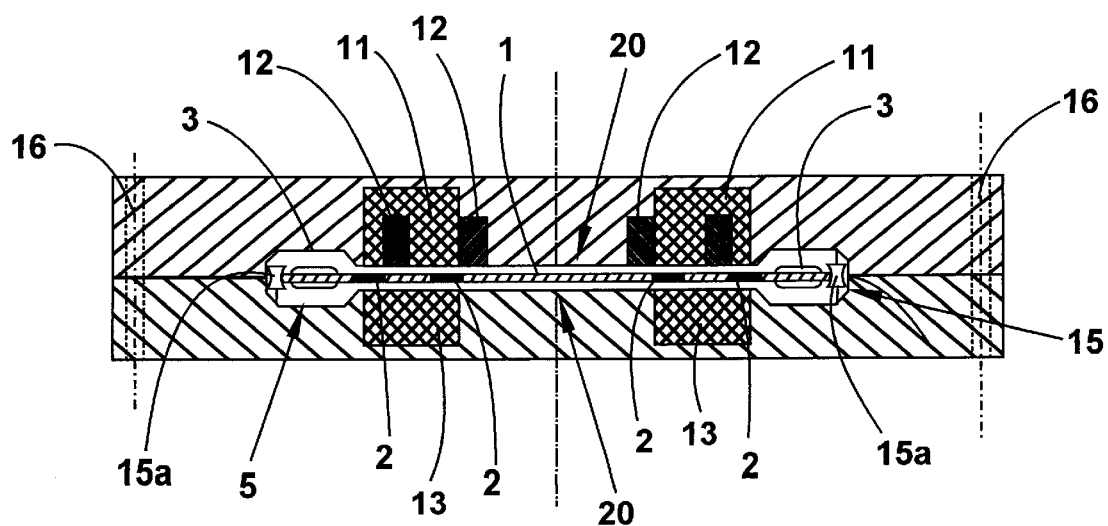

In the embodiment according to the FIGS. 6 and 7, a bipartite stator casing 10 is provided, the rotor 1 being accommodated between the two parts of the stator casing 10a, 10b. The rotor is carried in bearings in a way very much similar to the embodiment according to the FIGS. 1 and 2. Unlike the embodiment according to the FIGS. 1 and 2, in which the stator 10 is provided with iron cores or iron yokes with windings arranged on both sides of the rotor, the one stator half 10b in the embodiment according to the FIGS. 6 and 7 merely has one ferric short circuit 13 without any winding, i.e. this stator half is passive. This variant is somewhat less expensive than an embodiment with two active stator halves, but the performance is also somewhat reduced.

Figure 8:
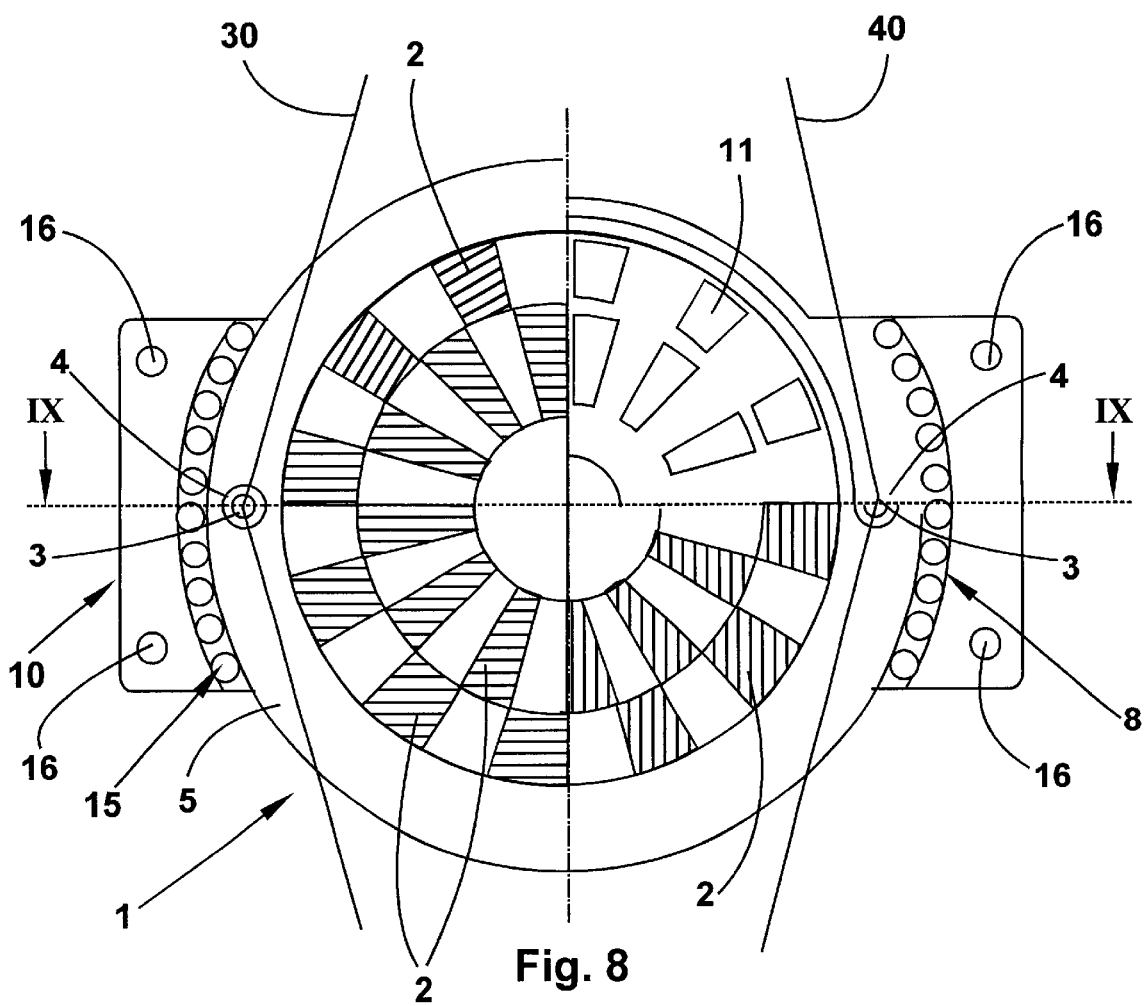
FIGS. 8 and 9 show another embodiment with two stator halve and two rotors, a disc-shaped ferric short circuit being accommodated between the rotors.
Figure 9:
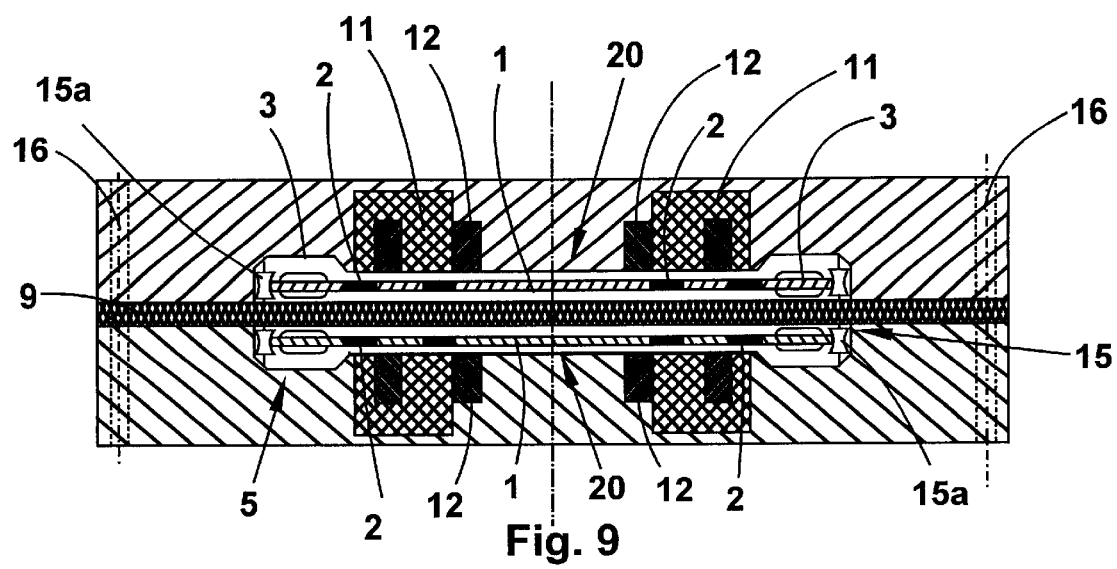

The embodiment according to the FIGS. 8 and 9 is characterized by two rotors 1, which are designed in a way similar to the embodiment in FIG. 1 and in FIG. 2, this being the reason why they are referred to here. These two rotors are located between the two stator halves 10a, 10b, a disc-shaped ferric short circuit 9 being provided between the two rotors 1. This disc is fixedly arranged in the stator 10. The stator halves are each provided with iron cores 11 with windings 12. Two separate magnetic circuits are thus created, so that the rotors may be driven independently of each other. In this case too, the rotors 1 are carried in rolling bearings 15. Thanks to two rotors working independently of each other, it is possible to make two selvedges, whereas one of these selvedges may serve as a cut-off selvedge. With regard to the remaining characteristics of the embodiments according to the FIGS. 6 to 9, we refer to the explanations given with regard to the FIGS. 1 and 2.

It has to be noted that the short circuit must consist of magnetically conductive material. Usually, the short circuit consists in an iron core with several laminations.

What is claimed is:

1. A device for forming a leno selvedge with an electric motor comprising a rotor (1; 200) and a stator casing (10) accommodating the rotor, whereas the rotor is provided with at least two guiding apertures (3; 216, 216b) for doup ends and whereas the rotor (1, 200) is provided with several magnetic poles oriented in an axial direction, characterized in that the rotor (1; 200) is provided with two spaced magnetic rings (210, 220) arranged in a radial direction, the magnetic rings (210, 220) being provided with several magnet segments, (2; 211, 212; 221, 222) each of the magnet segments (2; 211, 212) of the one magnetic ring (2; 210) being locally offset relative to the other magnetic ring (2; 210, 220), whereas the rotor (1; 100) is received on both sides in the axial direction by the stator casing (10; 225), whereas the stator casing (10; 225) is provided with iron cores (11; 230, 240) with appropriate windings (12; 250), ends of the windings being oriented toward the magnetic poles of the rotor.

2. Device according to claim 1, characterized in that the rotor (1; 200) is designed as a disc.

3. Device according to claim 1, characterized in that the rotor (1; 200) is designed as a circular disc.

4. Device according to claim 1, characterized in that the C-shaped iron cores (11; 230, 240) axially lock the rotor (1; 200) on both sides.

5. Device according to claim 1, characterized in that the stator casing (10; 225) encompasses the rotor (1; 200) on its periphery by more than 180° so that the rotor (1; 200) may be locked positively.

6. Device according to claim 1, characterized in that an air gap (20) is provided in axial direction between the stator casing (10; 225) and the rotor (1; 200).

7. Device according to claim 1, characterized in that the direction of rotation of the rotor (1; 200) is reversible.

8. Device according to claim 1, characterized in that the casing (10; 225) and hence the rotor (1; 200) may be mounted at right angles on the power-operated loom.

9. Device according to claim 1, characterized in that the rotor (1; 200) is carried without contact on bearings in the stator casing (10; 225).

10. Device according to claim 1, characterized in that the magnetic rings (210, 220) are designed as discs.

11. Device according to claim 1, characterized in that the neighbouring magnet segments (211, 212; 221, 222) of the two magnetic rings (210, 220) have an opposite polarization.

12. Device according to claim 1, characterized in that the circular disc (200) constituting the rotor of the motor is provided with a supporting disc (215) made of non magnetic material, followed in radial direction by the first magnetic ring (210), said first magnetic ring (210) being followed in radial direction as well by a spacer ring (217) made of non magnetic material, followed itself in radial direction by the other magnetic ring (220), which is encompassed by a guiding ring (216), the guiding ring (216) being provided with the apertures (216a, 216b) for the doup ends.

13. Device according to claim 1, characterized in that the iron cores (230, 240), which are arranged in the stator casing (225) and communicate with the winding (250) of the stator, are aligned one behind the other in a top view consideration on the stator.

14. Device according to claim 1, characterized in that the rotor (1; 200), which is designed as a circular disc, is provided on either side by a magnetically nonconducting foil to the purpose of increasing its stability.

15. Device according to claim 1, characterized in that the foil is glued onto the different elements constituting the disc (1; 200).

16. Device according to claim 1, characterized in that the stator casing (10, 225) is composed of two parts, the rotor (1; 200) being accommodated between the two of them.

17. Device according to claim 1, characterized in that a ferric short circuit (9) is provided between the two halves of the stator casing (10a, 10b) of the stator (10), one rotor (1) being provided between each of the stator halves (10a, 10b) and the ferric short circuit (9).

* * * * *